United States Patent [19]

Frank

[11] 4,456,145
[45] Jun. 26, 1984

[54] WEATHERPROOF OUTLET COVER

[75] Inventor: John R. Frank, Weston, Mass.

[73] Assignee: L. E. Mason Co., Boston, Mass.

[21] Appl. No.: 430,858

[22] Filed: Sep. 30, 1982

[51] Int. Cl.³ .............................................. H02G 3/14
[52] U.S. Cl. .................................. 220/242; 220/334;
339/44 M; 339/44 R
[58] Field of Search ..................... 220/242, 334, 3.8;
339/44 M, 44 R, 94 M; 174/53, 66, 67

[56] References Cited

U.S. PATENT DOCUMENTS

| | | | |
|---|---|---|---|
| 2,867,345 | 1/1959 | Bellek | 220/242 |
| 2,870,933 | 1/1959 | Winter | 220/242 |
| 4,058,358 | 11/1977 | Carlisle | 220/242 |
| 4,917,959 | 4/1980 | Kramer | 220/242 |

Primary Examiner—George T. Hall
Attorney, Agent, or Firm—Cesari and McKenna

[57] ABSTRACT

A weatherproof outlet cover is composed of a metal cover plate having an aperture, a generally U-shaped bracket secured to the plate adjacent the aperture and an aperture cover for covering the aperture. The aperture cover includes a main body which is shaped to cover the plate aperture and an extension which fits between the bracket legs. Hinge posts projecting from the sides of the extension hingedly connect the aperture cover to the bracket legs so that the cover can swing toward and away from the plate. The aperture cover extension also defines a pocket which is open at the underside of the aperture cover and in which a coiled wire spring is positioned on the hinge axis. One end segment of the spring engages in and is retained by the pocket wall, while the opposite end of the spring projects from the mouth of the pocket and extends into and is retained by a hole in the bracket so that, when the aperture cover is swung to its open position, the coil is wound up and urges the cover back toward its closed position over the plate aperture.

9 Claims, 4 Drawing Figures

WEATHERPROOF OUTLET COVER

This invention relates to an outlet cover. It relates more particularly to an improved weatherproof cover for electrical outlets, switches and the like.

BACKGROUND OF THE INVENTION

Weatherproof covers are used in conjunction with electrical boxes or other housings to protectively enclose various fixtures, among other things. Such covers are particularly useful to afford ready access to exterior electrical outlets while protecting them from the weather. Accordingly, we will describe the present invention in that context.

The typical electrical outlet box is generally rectangular and closed on five sides. The box is recessed into or mounted exteriorly of a structure so that its open side is accessible. The box is typically sized to receive a standard duplex outlet and the outlet is secured to the box with its front face substantially flush with the open face of the box. An opening in a wall of the box permits passage of electrical leads for connecting the outlet to a suitable source of electric power.

The cover of the general type with which we are concerned here includes a cover plate which is coextensive with the open side of the box. That plate is provided with one or more apertures shaped and located so as to expose the working parts of the outlet contained in the box. The cover is usually secured in place by screws or other fasteners extending through openings in the plate and turned down into threaded holes in the box or the outlet contained therein.

The usual weatherproof cover also includes one or more spring-loaded aperture covers hinged to the cover plate which, when closed, cover and protect the electrical outlet mounted in the box when the outlet is not in use.

Prior weatherproof covers of this general type are usually relatively complex structures composed of many parts which are fairly difficult to make and to assemble. They require separate hinge pins which must be pivotally mounted to the cover plates and springs which must be engaged on those pins with their ends secured by fasteners to the plates and aperture covers respectively so that the springs will remain in proper position to bias the aperture covers to their closed positions against the plates.

Attempts have been made to simplify the construction of such covers. For example, the cover disclosed in U.S. Pat. No. 4,134,516 owned by the assignee of the present application forms hinge posts integrally with the aperture covers and biases those covers to their closed positions using a straight cantilevered spring wire. However, both the cover plate and the aperture covers of that prior unit must require relatively complex shapes with reentrant holes or overhangs to form their required hinge connections and to capture the spring wire. Therefore, those parts must be formed by a die-casting process.

Another type of prior cover disclosed in U.S. Pat. No. 3,127,048 connects the aperture cover to the cover plate using a so-called living hinge. The aperture cover is made of plastic and is formed with a thin flexible web whose edge margin is riveted to the cover plate so that the aperture cover can swing on that web toward and away from the aperture in the cover plate. A coil spring positioned between the aperture cover and the plate has one end connected by a rivet to the cover plate, while its opposite end engages over the aperture cover to bias the cover to its closed position. That prior cover is disadvantaged in that the aperture cover has to be made of a plastic capable of forming a living hinge and that material is not as rugged and durable as metal. Also, the coil spring found in that prior cover has to be riveted to the cover plate along with the aperture cover thereby increasing assembly costs.

There do exist many other types of weatherproof outlet covers which are disadvantaged in one or another respect rendering them relatively difficult to manufacture and therefore relatively expensive to purchase in the marketplace.

SUMMARY OF THE INVENTION

Accordingly, it is an object of the present invention to provide an improved weatherproof outlet cover for electrical fixtures and the like.

Another object of the invention is to provide a cover of this general type composed of only a few main parts which are relatively inexpensive to manufacture.

A further object of the invention is to provide such a cover whose parts can be assembled quickly and easily.

Still another object of the invention is to provide a weatherproof outlet cover which provides a superior sealing closure for the electrical or other fixture with which it is associated.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present weatherproof cover comprises a stamped metal cover plate that is of the appropriate size and shape to close the open side of the standard outlet box with which it is associated. The cover plate is provided with one or more apertures which accommodate the working portions of the electrical fixture or device for which the cover is designed, e.g. a single electrical outlet. Also, one or more screw holes is provided in the plate to anchor the plate to its outlet box or to the fixture contained in that box.

The weatherproof cover also includes an aperture cover which is of the appropriate size and shape to completely cover each aperture in the cover plate. Each aperture cover has a relatively simple shape with no reentrant holes or overhangs. Therefore, it can be formed by a simple vertical molding process using relatively inexpensive mating mold sections without side gates, etc.

When molding the aperture cover, a pair of oppositely extending collinear hinge posts are formed adjacent one edge of the cover. Also, one or more collinear pockets are formed between the hinge posts for containing the spring or springs that will bias the aperture cover to its closed position against the cover plate. The aperture cover is otherwise configured to fit over and cover the aperture in the cover plate and the electrical outlet or other fixture exposed in that aperture when the cover is in use.

The third component of the weatherproof cover is a generally U-shaped stamped metal bracket that is riveted to the cover plate adjacent the aperture therein. The bracket legs are spaced apart and project up from the face of the cover plate. The free ends of those legs are slotted to form saddles for receiving the hinge posts on the aperture cover. Those hinge posts are rotatively retained in the bracket slots by crimping the free ends of the bracket legs thereby permitting the aperture cover to swing between a closed position wherein it lies flush against the cover plate over the aperture therein and an open position wherein it extends more or less perpendicular to the plate, thereby fully exposing the plate aperture.

The aperture cover is biased toward its closed position by a coil spring positioned in the pocket formed in the aperture cover. A straight segment at one end of the spring coil is captured by the aperture cover pocket wall at one end of the pocket; a straight segment at the opposite end of the coil is captured in a hole formed in the bracket adjacent the opposite end of the pocket. The spring is oriented in the pocket so that when the aperture cover is swung to its open position, the spring is wound tighter so that it urges the cover toward its closed position.

To assemble the weatherproof cover, the bracket is riveted to the cover plate. A coil spring is then positioned in the aperture cover pocket often by using a tool which engages the straight end segments of the coil and winds up the spring somewhat as it is seated in the pocket. The pocket is shaped so that, when those spring segments are released, they engage opposite walls of the pocket so that the spring remains in that tensioned condition. Furthermore, the spring end segment to be anchored to the bracket projects out of the pocket. The aperture cover is then placed flush against the cover plate with its hinge posts engaging in the bracket slots. The position of the spring is such that its projecting end segment automatically extends into the hole formed in the bracket therefor when the aperture cover hinge posts are seated in their slots. Finally, the bracket ends are crimped manually or, more preferably, by a crimping tool which can be brought down over the assembly.

Thus, the present weatherproof cover is composed of only four different main parts, namely a cover plate and bracket both of which are simple stamped metal parts which are quite inexpensive to make in quantity, a simply-shaped metal aperture cover which can be formed inexpensively by molding and a standard coiled wire spring. All of these parts can be quickly and easily assembled as described above so that the overall cost of the weatherproof cover is kept to a minimum. Since the cover parts are all made of a strong weather-resistant metal, the cover should have a long useful life.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
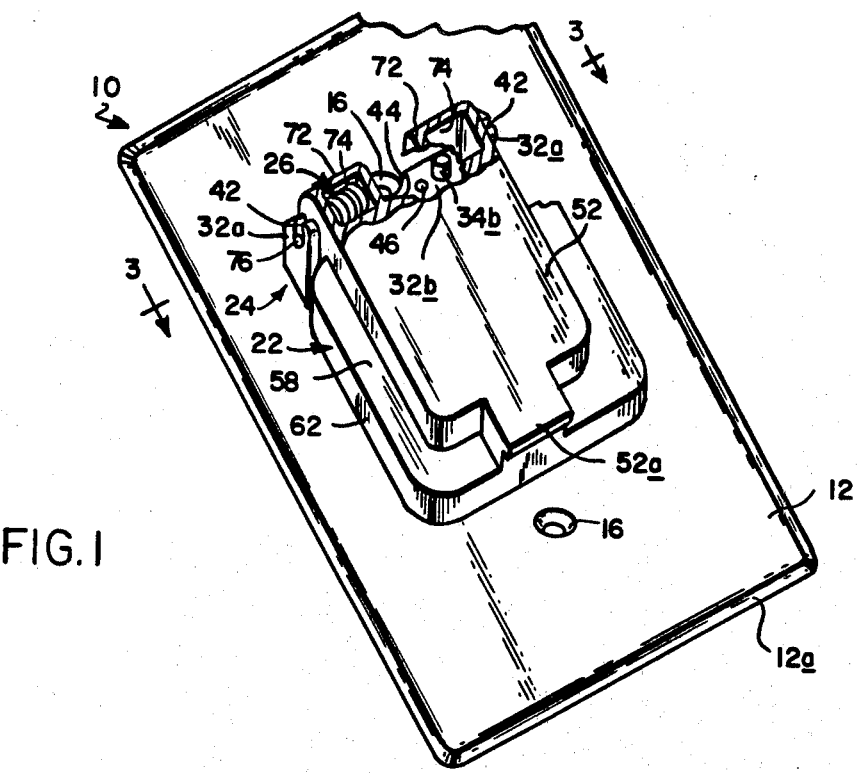
FIG. 1 is a perspective view with parts broken away of a weatherproof cover embodying the features of this invention, with the cover being shown in its closed position.

Referring to FIG. 1, the illustrated weatherproof cover indicated generally at 10 is designed to be mounted to an outlet box (not shown) containing a single electrical outlet (also not shown). Using the principles of this invention, comparable covers can be designed to accommodate duplex outlets, switches and other electrical and mechanical fixtures exposed to the weather.

Figure 2:
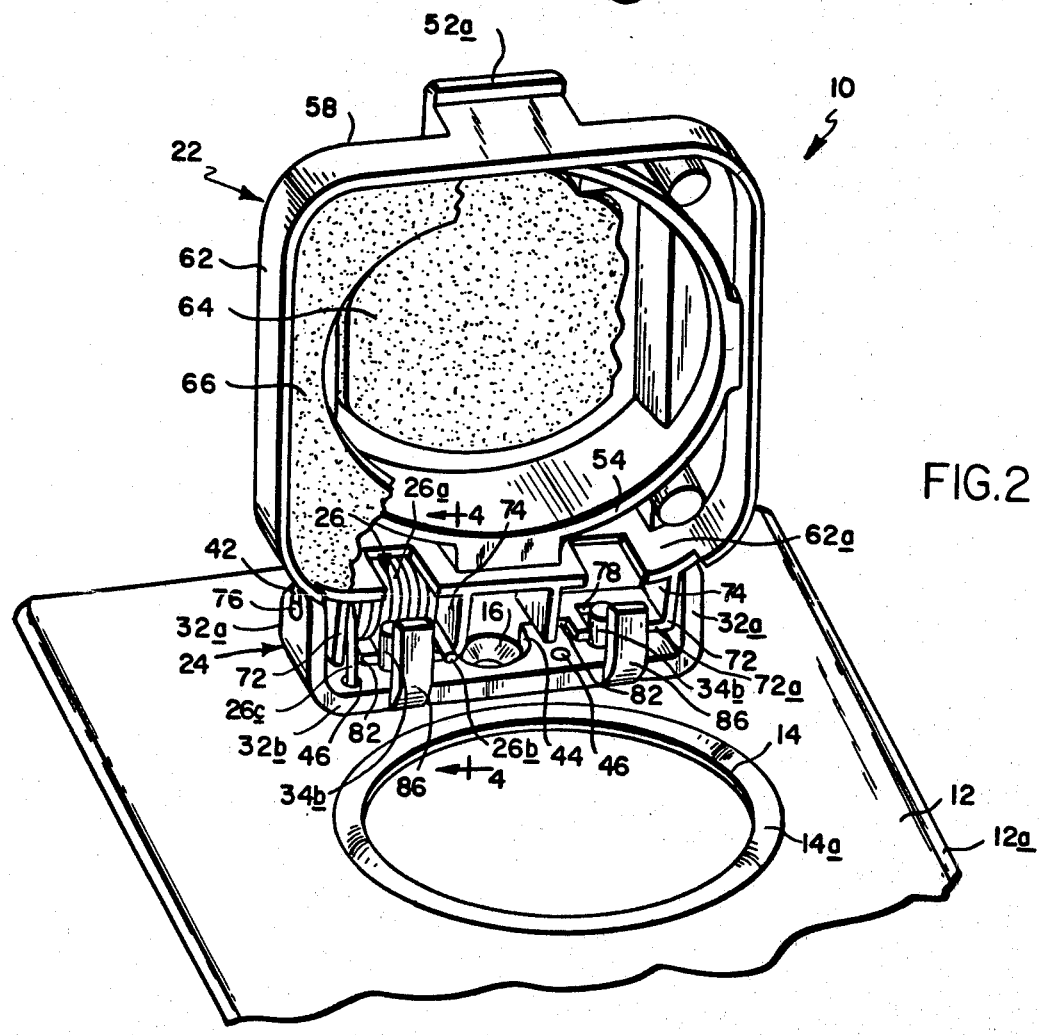
FIG. 2 is a view similar to FIG. 1 on a larger scale showing the cover in its open position.

Cover 10 comprises a generally rectangular, flat, thin, stamped metal cover plate 12 formed with a beveled edge 12a. A single large circular aperture 14 best seen in FIG. 2 is present at the center of the plate for receiving the working face of the electrical outlet. The edge of that aperture is upwardly ridged as shown at 14a. One or more small countersunk holes 16 are formed in plate 12 for receiving the screws that attach the cover plate to the associated box or to the fixture contained therein. In the illustrated cover 10, there are two such openings 16 spaced in front of and behind the aperture 14.

The weatherproof cover 10 also includes an aperture cover indicated generally at 22 which is pivotally mounted to a generally U-shaped bracket 24 anchored to plate 12 at a location just behind aperture 14. Cover 22 is swingable between a closed position shown in FIG. 1 wherein it lies flush against plate 12 covering aperture 14 and an open position illustrated in FIG. 2 wherein cover 22 lies more or less perpendicular to plate 12 so that aperture 14 is fully exposed. Cover 22 is biased toward its closed position by a spring shown generally at 26 positioned in cover 22. When the aperture cover 22 is in its open position, a standard plug can be plugged into the electrical outlet exposed at aperture 14. That plug serves also to maintain the cover 22 in its open position. On the other hand, when the plug is removed from the outlet, cover 22 is urged by spring 26 to its closed position wherein it completely covers and protects that fixture from the weather.

Figure 3:
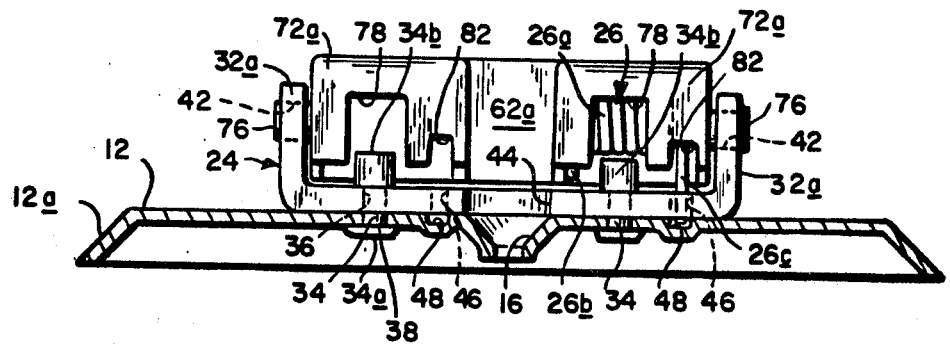
FIG. 3 is a sectional view on a larger scale along line 3—3 of FIG. 1.

As best seen in FIGS. 2 and 3, bracket 24 is a generally U-shaped, stamped metal, strap-like part having a pair of upstanding legs 32a connected by a bridging section 32b. The bracket bridging section 32b is anchored to plate 12 by a pair of spaced-apart headed rivets 34 extending through pairs of registering openings 36 and 38 in the bracket and plate respectively with the rivet ends 34a being upset at the underside of plate 12 as shown in FIG. 3. The head 34b of each rivet is generally cylindrical in shape and projects up appreciably from the bracket bridging section 32b inboard of the bracket legs 32a.

The free ends of bracket legs 32a are formed with longitudinal slots 42 that constitute one-half of the pivotal connection between the aperture cover 22 and the bracket 24. Also, a small notch 44 formed in the rear edge of the bracket bridging section 32b provides clearance for the rear fastener hole 16 in plate 12. In addition, a pair of small holes 46 are formed through the bracket bridging section 32b at one side, e.g. to the right, of each rivet 34 for reasons that will become apparent later. When the bracket 24 is properly mounted to plate 12, those holes 46 are in register with small dimples 48 punched into plate 12 which effectively extend the depths of those holes as best seen in FIG. 4.

Referring again to FIGS. 1 and 2, the aperture cover 22 is a generally rectangular shell-like molded metal part. It comprises a central raised portion 52 whose underside is formed with a circular wall 54 defining a circular recess or well in portion 52. The diameter of wall 54 is slightly larger than that of plate aperture 14 so that when the cover 22 is in its FIG. 1 closed position, the wall 54 closely encircles aperture 14 with the cover recess 56 providing clearance fo the fixture projecting into aperture 14. A lateral flange 58 extends around the front and side edges of aperture cover portion 52, except at the center front thereof where a nose protrudes to form a lifting tab or handle 52a. Also, a skirt 62 depends from the flange edges, having a contiguous segment 62a (FIGS. 2 and 4) extending down from the rear edge of cover portion 52. Consequently, when that cover is in its closed position shown in FIG. 1, the skirted flange 58 completely covers an annular portion of plate 12 around aperture 14.

A closed cell foam rubber pad 64 is adhered to the bottom of the cover 52 within wall 54. A second such pad 66 is adhered to the underside of cover 22 between its recess 56 and skirt 62. When cover 22 is in its closed position, pad 64 is pressed against the face of the fixture received in the plate aperture 14 and pad 66 is pressed against the aperture ridge 14a thereby providing a double seal to protect the fixtures from the weather. A marginal gasket (not shown) made of cork or the like is normally provided at the underside of the cover plate 12 to provide a seal between the cover plate and the edge of the outlet box to which the plate is fastened.

Figure 4:
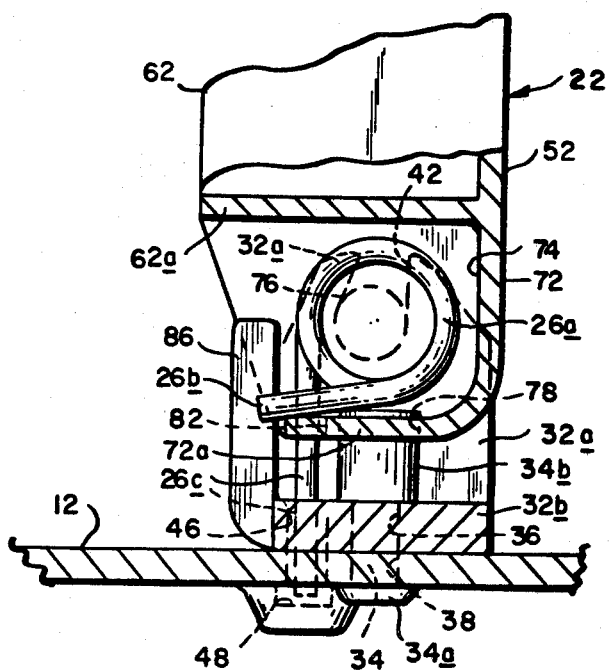
FIG. 4 is a sectional view on a still larger scale along line 4—4 of FIG. 2.

Referring now to FIGS. 2 to 4, a pair of generally rectangular parallel extensions 72 project from the rear of cover section 52 at the opposite ends of its skirt segment 62a directly opposite rivets 34. Each such extension 72 defines a pocket 74, at least one of which contains a biasing spring 26. Projecting laterally from the remote side walls of extensions 74 are a pair of collinear hinge posts 76. These pins are arranged to seat in the slots 42 formed at the ends of bracket legs 32a so that when the bifurcated end of each bracket leg 32a is crimped around the associated hinge pin 76 as best seen in FIG. 4, the aperture cover 22 is hingedly connected to bracket 24, permitting the cover to swing between its closed and open positions illustrated in FIGS. 1 and 2 respectively.

As shown in FIGS. 2 to 4, the rear wall 72a of each extension 72 opposite skirt segment 62a contains a generally rectangular notch 78 that is located directly opposite a rivet head 34b. When the aperture cover 22 is open as in FIG. 2, the bottom edges of those notches engage the associated rivet heads 34b, thereby establishing the open position of the cover as being more or less perpendicular to cover plate 12.

Referring now to FIGS. 3 and 4, the spring 26 includes a coil 26a which seats snugly in the associated extension pocket 74. The coil has a straight wire segment 26b at one end thereof which bears against the notched wall 72a of that extension 72. The opposite end of coil 26a adjacent skirt segment 62a is terminated by a straight wire segment 26c that projects out of extension pocket 74 through the underlying bracket hole 46 and into the registering plate dimple 48. The spring 26 is oriented in its pocket 74 so that, when the aperture cover 22 is swung from its closed to its open position, the aforesaid retention of the spring end segments 26b and 26c by the extension wall and bracket respectively cause the spring 26 to be wound up so that the spring urges cover 22 toward its closed position. A small slot 82 is provided in each extension wall 72a adjacent its notch 78 to provide clearance for spring segment 26c when the cover is swung to its open position as best seen in FIGS. 2 and 4.

Normally, spring 26 is retained in its pocket 74 by the frictional engagement of its end segment 26b against wall 72a and by the engagement of end segment 26c in its bracket hole. However, to insure that the spring cannot pop out of its pocket when cover 22 is opened, the bracket 24 may be formed with a pair of integral upwardly extending fingers or tabs 86. A finger 86 thus lies directly opposite each aperture cover pocket 74 so that when the aperture cover 22 is open, the fingers 86 block the mouths of those pockets as best seen in FIGS. 2 and 4. Therefore, the spring 26 is assuredly maintained essentially at the hinge axis defined by the aperture cover hinge posts 76 even though the spring is not actually engaged on a hinge pin or axle.

The illustrated cover 10 is shown with a single spring 26 in its left-hand cover pocket 74. Obviously, if more bias is required to maintain the cover 22 tightly closed, an identical spring 26 may be retained in the right-hand pocket 74 exactly as described above. Also, if cover plate 12 should have two apertures 14, the flanged aperture cover portion 52 may be extended to overlie and close both such apertures. Alternatively, two separate covers 22 may be hingedly mounted to two brackets 24 secured to plate 12 adjacent the two apertures so that each aperture may be exposed independently of the other.

The weatherproof cover 10 is assembled easily by placing the bracket 24 on cover plate 12 so that corresponding sets of rivet holes 36 and 38 are in register and then inserting the rivets 34. When the bracket is anchored to the plate, the bracket holes 46 are automatically in register with the corresponding plate dimples 48. Then, each spring 26 is positioned in its pocket 74 with the protruding spring end segment 26c located at the left-hand end of pocket 74 as viewed in FIGS. 1 and 2. The placement of the spring in its pocket winds up the spring coil 26a to some extent so that the spring end segment 26b engages against the extension rear wall 72a while the longer spring and segment 26b engages against the cover skirt segment 62a. Such placement can be facilitated by a tool or jig which engages the wire end segments 26b and 26c and forces them into parallelism.

The aperture cover 22 is then positioned over the plate aperture 14 so that its hinge posts 76 seat in the bracket slots 42. This automatically positions the protruding spring segment 26c so that its end projects through the bracket hole 46 into the registering plate dimple 48. Finally, the free ends of the bracket legs 32a are crimped as aforesaid to rotatively retain the aperture cover to the bracket.

It will be seen from the foregoing, then, that the improved weatherproof cover disclosed herein is formed of a relatively few main components which are either stamped or molded metal parts. Consequently, the components of the cover can be made quite inexpensively. Furthermore, those parts can be assembled to form the finished cover quite easily by the average assembler because the proper position of the bracket on the plate is established by registration of the rivet holes. Also, the biasing spring 26 does not have to be threaded onto a hinge or otherwise fixedly secured to components of the cover. It is simply positioned in an aperture cover pocket 74. Such positioning automatically locates the spring coil 26a on the hinge axis and positions the spring end segments 26b and 26c properly for retention by the cover 22 and bracket 26 respectively when the cover 22 is positioned on the bracket. Because of the aforesaid advantages, the weatherproof cover 10 disclosed herein should find wide customer acceptance.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A weatherproof outlet cover comprising
   A. a stamped metal plate having an aperture therein;
   B. a generally U-shaped stamped metal bracket for positioning flush against the plate adjacent the aperture, said bracket having a pair of spaced-apart parallel legs and a bridging section connecting said legs;
   C. plural spaced-apart fastening means securing the bracket bridging section to the plate;
   D. a molded metal aperture cover, said aperture cover having
      1. a shell-like main body shaped and sized to cover the plate aperture; and
      2. an extension;
         a. projecting laterally from one side of the main body;
         b. being slightly narrower than the distance between the bracket legs so that the extension fits between said legs; and
         c. defining a pocket that is open at the underside of the aperture cover;
   E. coacting hinge means formed at the opposite sides of the aperture cover extension and on said bracket legs for hinging the aperture cover about a hinge axis that permits that cover to be swung between a closed position wherein it lies flush against the plate and covers the aperture therein to an open position wherein it lies more or less perpendicular to the plate exposing said aperture;
   F. a coiled wire spring positioned relatively snugly in said pocket so that it is positioned more or less on the hinge axis defined by the hinge means, one end segment of the wire spring engaging and being retained by a wall of the pocket, the opposite end segment of the wire spring projecting from the mouth of the pocket to the bracket bridging section; and
   G. means on the bracket bridging section for retaining said spring wire opposite end segment so that when the aperture cover is swung toward its open position, the spring is wound up so that it urges the aperture cover toward its closed position.

2. The weatherproof outlet cover defined in claim 1 wherein the hinge means comprise
   A. a pair of collinear hinge posts extending in opposite directions from the opposite sides of said extension; and
   B. longitudinal slots in said bracket legs for receiving said hinge posts, the open ends of said slots being narrowed so as to rotatively capture the hinge posts.

3. The weatherproof outlet cover defined in claim 1 wherein the retaining means comprise an opening in the bracket bridging section into which said spring opposite end segment extends.

4. The weatherproof outlet cover defined in claim 1 and further including means for establishing the open position of the aperture cover.

5. The weatherproof outlet cover defined in claim 4 wherein the establishing means comprise means projecting from the bracket bridging section for engaging a wall of said extension when the aperture cover is oriented more or less perpendicular to the cover plate.

6. The weatherproof outlet cover defined in claim 5 wherein the projecting means comprise portions of said fastener means.

7. The weatherproof outlet cover defined in claim 1 and further including resilient sealing means positioned at the underside of the aperture cover for engaging an edge margin of the plate aperture when the aperture cover is in its closed position.

8. The weatherproof outlet cover defined in claim 7 and further including means defining a ridge around the edge margin of the aperture cover for engagement by the sealing means.

9. The weatherproof outlet cover defined in claim 1 wherein a portion of the bracket bridging section projects opposite the mouth of the aperture cover pocket when said cover is open.

* * * * *